(12) United States Patent
Salter et al.

(10) Patent No.: US 12,103,371 B2
(45) Date of Patent: Oct. 1, 2024

(54) TONNEAU COVER INCLUDING MOVEABLE PANELS

(71) Applicant: Ford Global Technologies, LLC, Dearborn, MI (US)

(72) Inventors: Stuart C. Salter, White Lake, MI (US); Jim Baumbick, Northville, MI (US); Annette Lynn Huebner, Highland, MI (US); Paul Kenneth Dellock, Northville, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 385 days.

(21) Appl. No.: 17/828,207

(22) Filed: May 31, 2022

(65) Prior Publication Data

US 2023/0382207 A1     Nov. 30, 2023

(51) Int. Cl.
    B60J 7/14           (2006.01)
    B62D 35/00        (2006.01)

(52) U.S. Cl.
    CPC .............. *B60J 7/141* (2013.01); *B62D 35/007* (2013.01)

(58) Field of Classification Search
    CPC ....... B60J 7/141; B62D 35/007; B62D 35/001
    See application file for complete search history.

(56) References Cited

U.S. PATENT DOCUMENTS

| | | | | |
|---|---|---|---|---|
| 3,768,858 A | * | 10/1973 | Boismier | B60J 7/141 296/100.09 |
| 5,011,214 A | * | 4/1991 | Friesen | B60J 7/141 296/100.09 |
| 7,131,684 B1 | * | 11/2006 | Gooding | B60J 7/141 296/100.1 |
| 9,145,177 B2 | | 9/2015 | Smith et al. | |
| 9,815,358 B1 | * | 11/2017 | Quintus | B60J 7/141 |
| 10,053,160 B2 | | 8/2018 | Erlandson | |
| 10,427,727 B2 | | 10/2019 | Polidori et al. | |
| 11,267,321 B2 | | 3/2022 | Jocz | |
| 2004/0160083 A1 | * | 8/2004 | Marx | B60J 7/041 296/100.09 |
| 2004/0195857 A1 | * | 10/2004 | Chverchko | B60J 7/1621 296/100.07 |
| 2010/0127529 A1 | * | 5/2010 | Elliott | B60J 7/141 296/100.09 |

(Continued)

FOREIGN PATENT DOCUMENTS

| | | | | |
|---|---|---|---|---|
| CA | 3100524 A1 | * | 2/2022 | ............ B60J 7/141 |
| CN | 111332183 A | * | 6/2020 | ............ B60J 7/141 |
| WO | WO-0035710 A1 | * | 6/2000 | ............ B60J 7/1621 |

*Primary Examiner* — Lori Lyjak (74) *Attorney, Agent, or Firm* — Vichit Chea; Carlson, Gaskey & Old, P.C.

(57) ABSTRACT

This disclosure relates to a motor vehicle including a tonneau cover with moveable panels. In some aspects, the techniques described herein relate to a motor vehicle, including: a cargo area; and a tonneau cover including a first side panel, a second side panel, and a central panel between the first and second side panels, wherein the tonneau cover is configurable in a first configuration in which the central, first side, and second side panels provide a cover for a top of the cargo area, and wherein the tonneau cover is configurable in a second configuration in which portions of the first side panel and the second side panel are raised relative to the first configuration.

20 Claims, 10 Drawing Sheets

(56) References Cited

U.S. PATENT DOCUMENTS

| | | | |
|---|---|---|---|
| 2016/0200376 A1* | 7/2016 | Kerr, III | B60J 7/198 |
| | | | 296/100.09 |
| 2017/0361691 A1* | 12/2017 | Fuller | B60J 7/198 |
| 2020/0108702 A1* | 4/2020 | Dylweski, II | B60J 7/198 |
| 2021/0170847 A1* | 6/2021 | Singer | B60P 3/42 |
| 2022/0242210 A1* | 8/2022 | Williams | B60J 7/1607 |
| 2022/0396131 A1* | 12/2022 | Williams | B60R 11/00 |
| 2023/0256799 A1* | 8/2023 | Harmon | B62D 33/0207 |
| | | | 296/100.09 |

* cited by examiner

TONNEAU COVER INCLUDING MOVEABLE PANELS

TECHNICAL FIELD

This disclosure relates to a motor vehicle including a tonneau cover with moveable panels.

BACKGROUND

Some motor vehicles, such as pickup trucks, include a cargo area, or cargo bed. The cargo area is typically located behind a passenger cabin of the vehicle. A tailgate can enclose a rear, or aft, end of the cargo area. Users use cargo areas to carry various types of loads and/or cargo. A tonneau cover can be used to cover a top of the cargo area.

SUMMARY

In some aspects, the techniques described herein relate to a motor vehicle, including: a cargo area; and a tonneau cover including a first side panel, a second side panel, and a central panel between the first and second side panels, wherein the tonneau cover is configurable in a first configuration in which the central, first side, and second side panels provide a cover for a top of the cargo area, and wherein the tonneau cover is configurable in a second configuration in which portions of the first side panel and the second side panel are raised relative to the first configuration.

In some aspects, the techniques described herein relate to a motor vehicle, wherein in the second configuration the first side panel and the second side panel are configured to deflect air away from the cargo area.

In some aspects, the techniques described herein relate to a motor vehicle, wherein the tonneau cover is configured such that, when moving between the first and second configurations: the first side panel rotates about an axis adjacent a side of the first side panel opposite the central panel, and the second side panel rotates about an axis adjacent a side of the second side panel opposite the central panel.

In some aspects, the techniques described herein relate to a motor vehicle, wherein the first side panel is connected to a first side wall by a first hinge, and wherein the second side panel is connected to a second side wall by a second hinge.

In some aspects, the techniques described herein relate to a motor vehicle, wherein the tonneau cover is configured such that, when moving between the first and second configurations: the central panel rotates about an axis adjacent a rear edge of the central panel, the first side panel rotates about an axis adjacent a first side of the central panel, and the second side panel rotates about an axis adjacent a second side of the central panel.

In some aspects, the techniques described herein relate to a motor vehicle, wherein the first side panel is connected to the central panel by a first hinge, and wherein the second side panel is connected to the central panel by a second hinge.

In some aspects, the techniques described herein relate to a motor vehicle, wherein the tonneau cover is configured such that, when moving between the first and second configurations: material providing the first side panel is unrolled from a first roller as the central panel is raised, and material providing the second side panel is unrolled from a second roller as the central panel is raised.

In some aspects, the techniques described herein relate to a motor vehicle, further including: a rear fairing mounted adjacent a rear end of the tonneau cover, wherein the rear fairing is moveable between a first configuration in which a majority of the rear fairing is forward of a tailgate of the motor vehicle and a second configuration in which a majority of the rear fairing projects rearward of the tailgate.

In some aspects, the techniques described herein relate to a motor vehicle, wherein: the rear fairing includes a rear panel slidable relative to the central panel.

In some aspects, the techniques described herein relate to a motor vehicle, wherein: the rear fairing includes a middle panel and first and second rear side panels, the middle panel is rotatably mounted adjacent a rear end of the central panel, the first rear side panel is rotatably mounted to a first side of the middle panel, and the second rear side panel is rotatably mounted to a second side of the middle panel opposite the first side of the middle panel.

In some aspects, the techniques described herein relate to a motor vehicle, wherein, when the rear fairing is in the second configuration, the first rear side panel and the second rear side panel contact the tailgate.

In some aspects, the techniques described herein relate to a motor vehicle, further including a connector configured to connect the central panel adjacent a top of a passenger cabin of the motor vehicle when the tonneau cover is in the second configuration.

In some aspects, the techniques described herein relate to a motor vehicle, wherein: a rear edge of the central panel exhibits a greater dimension than a front edge of the central panel, and sides of the first and second side panels adjacent the central panel exhibit a greater dimension than sides of the first and second side panels opposite the central panel.

In some aspects, the techniques described herein relate to a motor vehicle, wherein the first and second side panels are at least partially arranged in respective first and second side walls of the cargo area when the tonneau cover is in the first configuration.

In some aspects, the techniques described herein relate to a motor vehicle, further including an actuator assembly configured to move the tonneau cover between the first and second configurations.

In some aspects, the techniques described herein relate to a motor vehicle, wherein the actuator assembly is configured to move the tonneau cover from the first configuration to the second configuration when the motor vehicle exceeds a predefined threshold speed.

In some aspects, the techniques described herein relate to a motor vehicle, wherein the motor vehicle is a pickup truck.

In some aspects, the techniques described herein relate to a method, including: raising portions of a first side panel and a second side panel of a tonneau cover to deflect air away from entering a cargo area of a motor vehicle; and lowering the portions of the first side panel and the second side panel to cover a top of the cargo area.

In some aspects, the techniques described herein relate to a method, wherein the raising step includes rotating the first and second side panels relative to a central panel of the tonneau cover.

In some aspects, the techniques described herein relate to a method, wherein the raising step includes rotating the first and second side panels relative to respective first and second sides of the cargo area.

DETAILED DESCRIPTION

This disclosure relates to a motor vehicle including a tonneau cover with moveable panels. Among other benefits, this disclosure makes the vehicle more aerodynamic. Additional benefits will be appreciated from the below description.

Figure 1:
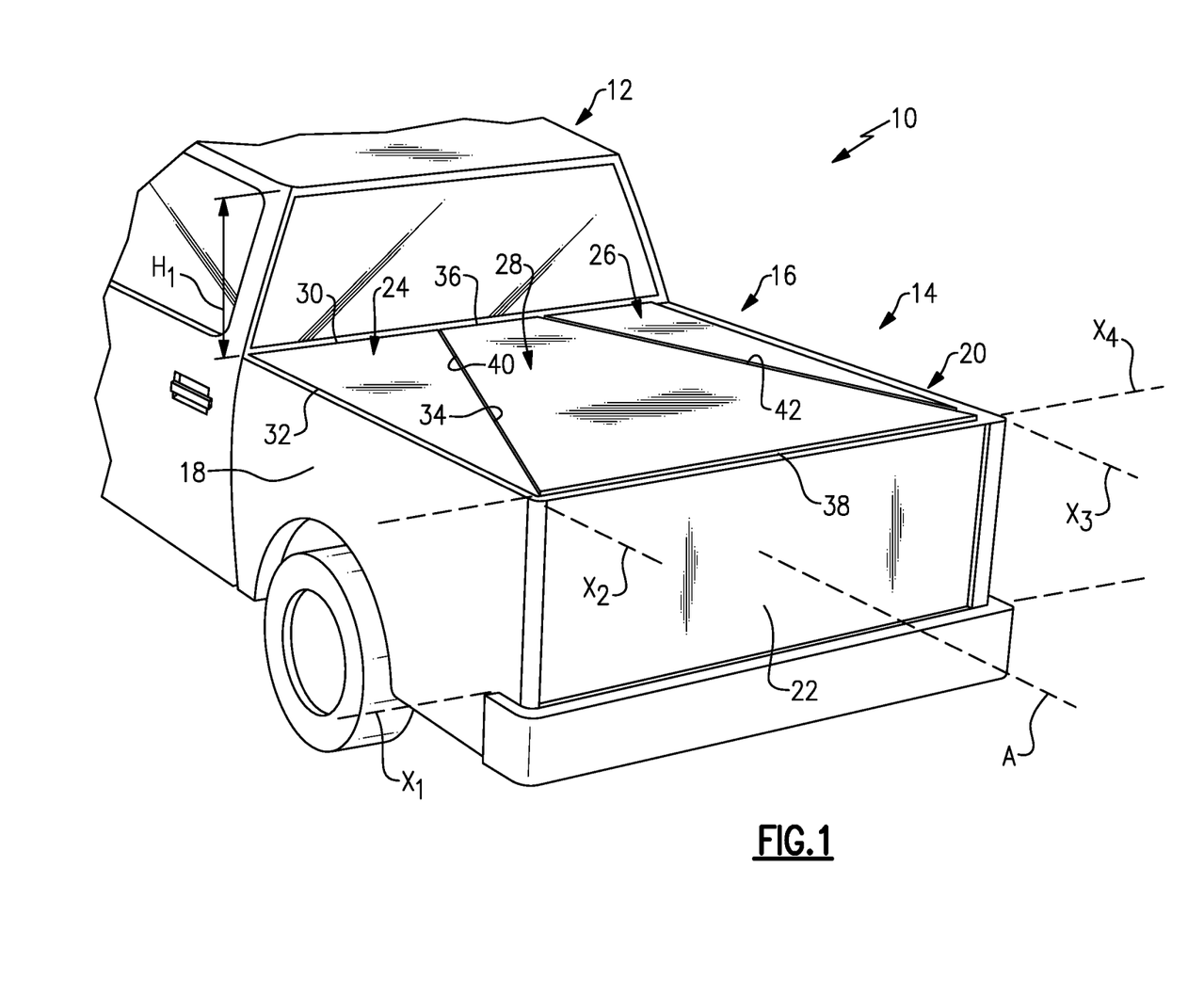
FIG. 1 is a rear-perspective view of a portion of a motor vehicle, which in this example is a pickup truck, and illustrates a first example tonneau cover in a first configuration.

FIG. 1 illustrates a portion of a passenger motor vehicle 10 ("vehicle 10"), which in this example is a pickup truck. While beneficial in the context of pickup trucks, this disclosure could extend to other vehicles besides pickup trucks, such as sport utility vehicles (SUVs), cars, vans, etc. The vehicle 10 can have either a unibody architecture or a body-on-frame architecture, as examples. The vehicle 10 can be an electrified vehicle such as a battery electric vehicle (BEV), plug-in hybrid electric vehicle (PHEV). Alternatively, the vehicle 10 could be a conventional vehicle powered solely or primarily by an internal combustion engine.

The vehicle 10 includes a passenger cabin 12 and, rearward of the passenger cabin 12, a cargo area, or cargo bed, 14. The cargo area 14 is open-topped and can be covered by a moveable tonneau cover 16.

The cargo area 14 includes bottom surface, or floor (sometimes called the "bed"), a first side wall 18 extending along a first side of the floor, a second side wall 20 extending along a second side of the floor opposite the first side wall 18, and a tailgate 22. In FIG. 1, the tailgate 22 is in a closed position. When in the closed position, the tailgate 22 encloses the cargo area 14 from the rear. In the open position, the tailgate 22 is rotated about 90° about a rotational axis $X_1$ which is substantially perpendicular to a centerline axis A of the vehicle 10, and is configured such that a user may access to the cargo area 14 from the rear.

In FIG. 1, the tonneau cover 16 is in a first configuration in which the tonneau cover 16 covers a top of the cargo area 14. In the first configuration, the tonneau cover 16 lies substantially parallel to the floor of the cargo area 14 and protects the contents of the cargo area 14 from exposure to the elements, such as rain, snow, and sun. The tonneau cover 16 is also selectively configurable in one or more second configurations in which at least some portions of the tonneau cover 16 are moved relative to the first configuration, such that those portions of the tonneau cover 16 deflect air away from certain areas adjacent the cargo area 14 and/or the exterior of the vehicle 10, thereby increasing the aerodynamic properties of the vehicle 10, including by reducing the wind drag of the vehicle 10.

In FIG. 1, the tonneau cover 16 includes a first side panel 24, a second side panel 26, and a central panel 28 between the first side panel 24 and the second side panels 26. The first side panel 24, the second side panel 26, and the central panel 28 may each be provided by polymer, fiberglass, aluminum, or composite materials to provide a hard tonneau cover 16 in one example. In another example, the tonneau cover 16 may be partially or fully soft, and one or more of the first side panel 24, the second side panel 26, and the central panel 28 may be provided by vinyl or canvas, supported by a frame.

In the embodiment of FIG. 1, the first side panel 24 includes a forward edge 30, a first side edge 32 adjacent the first side wall 18, and a second side edge 34 adjacent the central panel 28. The second side edge 34, which is closer to the central panel 28 than the first side edge 32, exhibits a greater length than the first side edge 32. The length of the forward edge 30 is substantially equal to a height dimension $H_1$ between a top of the first side wall 18 and a top of the passenger cabin 12. The first side edge 32 extends along substantially an entirety of the length of the first side wall 18 and, in this example, is rotatably connected to a top of the first side wall 18 by a hinge connection, such as a piano hinge or other similar connection. The first side panel 24 is configured to rotate about axis $X_2$, which is substantially parallel to the centerline axis A, via the hinge connection. The second side edge 34 is configured to interface with the central panel 28 when the tonneau cover 16 is in the first configuration and, as such, may include a portion of an overlapping interface, which may include a seal or gasket, configured to prevent leakage between the first side panel 24 and the central panel 28. While the first side panel 24 is described in detail, the second side panel 26 is arranged substantially similarly, reflected about the centerline axis A. Specifically, the second side panel 26 is configured to rotate about axis $X_3$.

The central panel 28 includes a forward edge 36 and a rear edge 38 spaced-apart by first and second sides 40, 42. In this example, the rear edge 38 spans substantially an entire length between the first and second side walls 18, 20. The forward edge 36 exhibits a length lesser than the rear edge 38 in this example. In other examples, the forward edge 36 spans substantially the entire length between the first and second side walls 18, 20. The first and second sides 40, 42 include complementary interfaces to the sides of the first and second side panels 24, 26 to prevent leakage into the cargo area 14 when the tonneau cover 16 is in the first configuration. In some examples, the central panel 28 is rotatable about an axis $X_4$ adjacent rear edge 38 and extending perpendicular to the centerline axis A and extending generally along a top of the tailgate 22 when the tailgate 22 is in the closed position.

Figure 2:
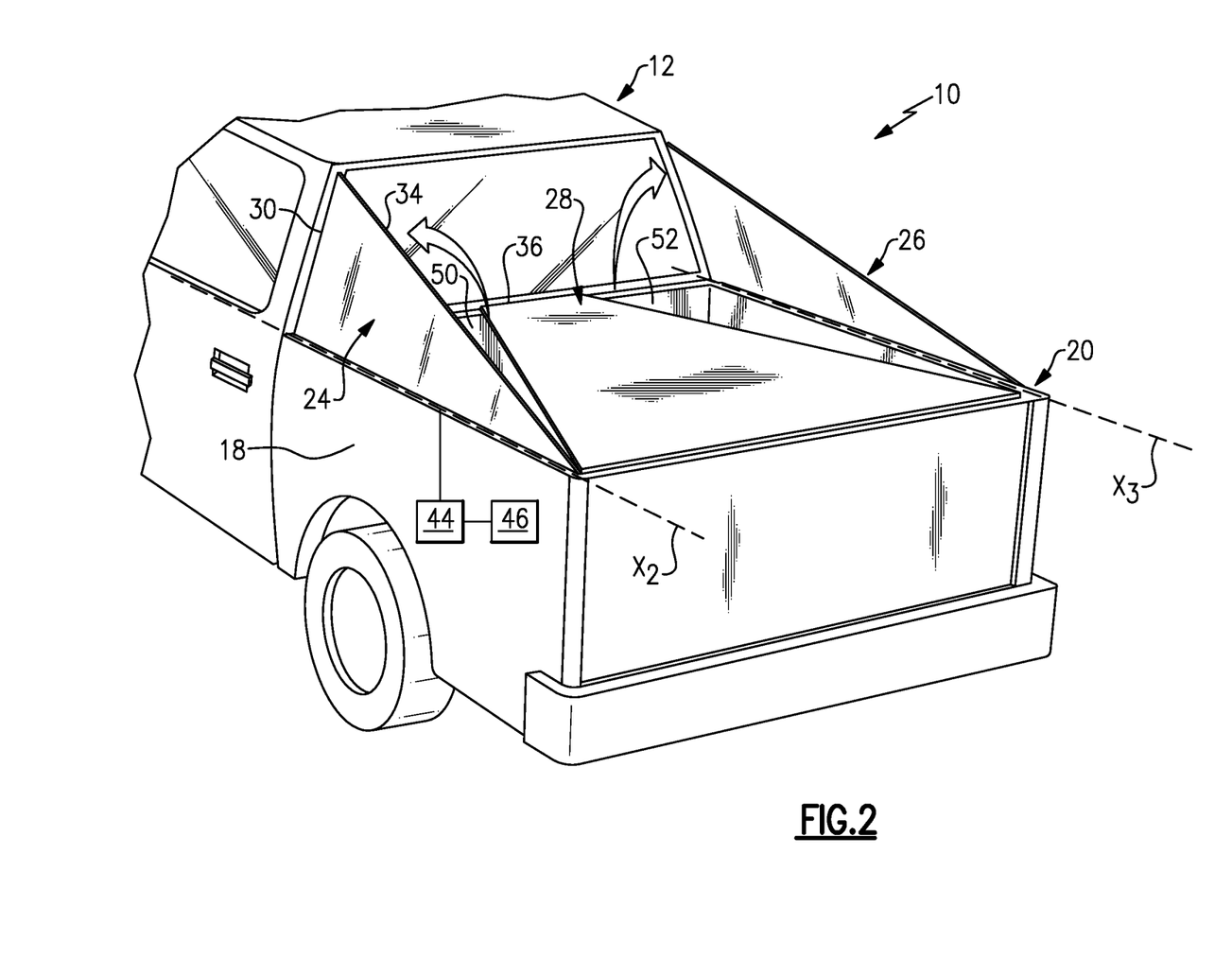
FIG. 2 is view similar to FIG. 1 and illustrates the first example tonneau cover in a second configuration.

FIG. 2 illustrates the tonneau cover 16 of FIG. 1 in a second configuration. In this configuration, the first and second side panels 24, 26 have rotated about axes $X_2$, $X_3$, respectively, to provide side fairings that deflect air passing along sides of the vehicle 10 away from the cargo area 14. With respect to the first side panel 24, the forward edge 30 spans substantially the entire distance between a top of the first side wall 18 and a top of the passenger cabin 12. The second side edge 34 gradually tapers moving rearwardly from the forward edge 30. The second side panel 26 is arranged similarly, reflected about the centerline axis A.

The first and second side panels 24, 26 are moveable between the first and second configurations either manually or automatically under the power of an actuator assembly. An actuator assembly 44 is schematically illustrated in FIG. 2. The actuator assembly 44 may include one or more moveable linkages and may include separate sub-assemblies associated with each part of the tonneau cover 16 that is moveable. The actuator assembly 44 is in electronic communication with a controller 46, in this example, which is configured to issue commands to the actuator assembly 44 to move the tonneau cover 16 between the first and second configurations. The actuator assembly 44 may include one or more motorized reels, cables, pulleys, linear actuators, etc., configured to facilitate movement of the panels of the tonneau cover 16. The actuator assembly 44 could be powered by a traction battery of the vehicle 10 if the vehicle 10 is an electrified vehicle, for example.

The controller 46 could be part of an overall vehicle control module, such as a vehicle system controller (VSC), or could alternatively be a stand-alone controller separate from the VSC. Further, the controller 46 may be programmed with executable instructions for interfacing with and operating the various components of the vehicle 10. The controller 46 includes a processing unit and non-transitory memory for executing the various control strategies and modes of the vehicle system.

The controller 46 may receive information from one or more sensors of the vehicle 10 and issue commands to the actuator assembly 44 based on that information. As one example, the controller 46 is configured to command the actuator assembly 44 to move the tonneau cover 16 to the second configuration when a speed of the vehicle 10 exceeds a predefined speed threshold, such as 25 miles per hour (mph). In another example, the controller 46 is configured to command the actuator assembly 44 to move the tonneau cover 16 to the first configuration when the vehicle 10 has parked. In another example, the controller 46 is configured to move the tonneau cover 16 to the first configuration if rain is detected or predicted based on a weather report, as examples. Other control strategies come within the scope of this disclosure.

When the actuator assembly 44 is present, the actuators of the actuator assembly 44 may be configured to hold the tonneau cover 16 in the second configuration. In other examples, various fasteners, such as clips, hook-and-loop, snaps, buttons, etc., could be used to hold the first and second side panels 24, 26 in place relative to the passenger cabin 12, for example.

In FIG. 2, when the tonneau cover 16 is in the second configuration, there are two spaces 50, 52 on opposite sides of the central panel 28, namely where the first and second side panels 24, 26 were in the first configuration. In another embodiment of this disclosure, the forward edge 36 of the central panel 28 spans the entire distance between the first and second side walls 18, 20 such that the central panel 28 fills the spaces 50, 52. In that example, in the first configuration, the first and second side panels 24, 26 rest on top of the central panel 28 and may attach to the central panel 28 using fasteners such as clips, hook-and-loop, snaps, buttons, etc.

Figure 3:
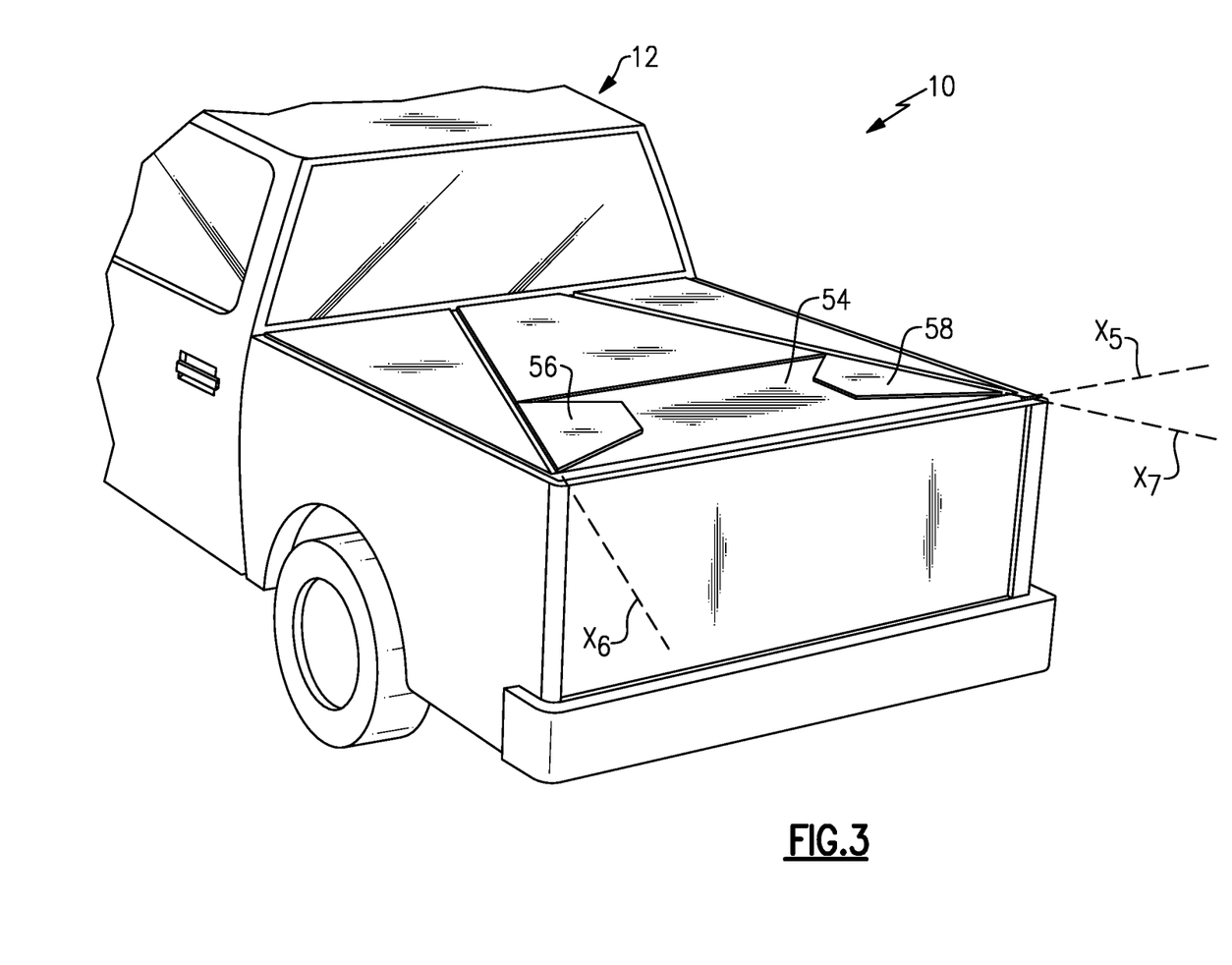
FIG. 3 illustrates an example tonneau cover including a rear fairing in a first configuration.

FIG. 3 illustrates an aspect of this disclosure that relates to a rear fairing. In this example, the tonneau cover 16 includes at least one panel moveable to provide a rear fairing. The at least one panel is moveable rearwardly to deflect air away from a rear of the vehicle 10.

In the embodiment of FIG. 3, the tonneau cover 16 includes a selectively-deployable rear fairing including a middle panel 54 and first and second rear side panels 56, 58. The middle panel 54 is rotatably mounted adjacent the rear edge 38 of the central panel 28 about an axis $X_5$ extending parallel to the axis $X_2$. In one example the axes $X_2$, $X_5$ are coextensive.

The first rear side panel 56 is rotatably mounted to a first side 60 of the middle panel 54 about axis $X_6$, and the second rear side panel 58 is rotatably mounted to a second, opposite side 62 of the middle panel 54 about axis $X_7$.

Figure 4:
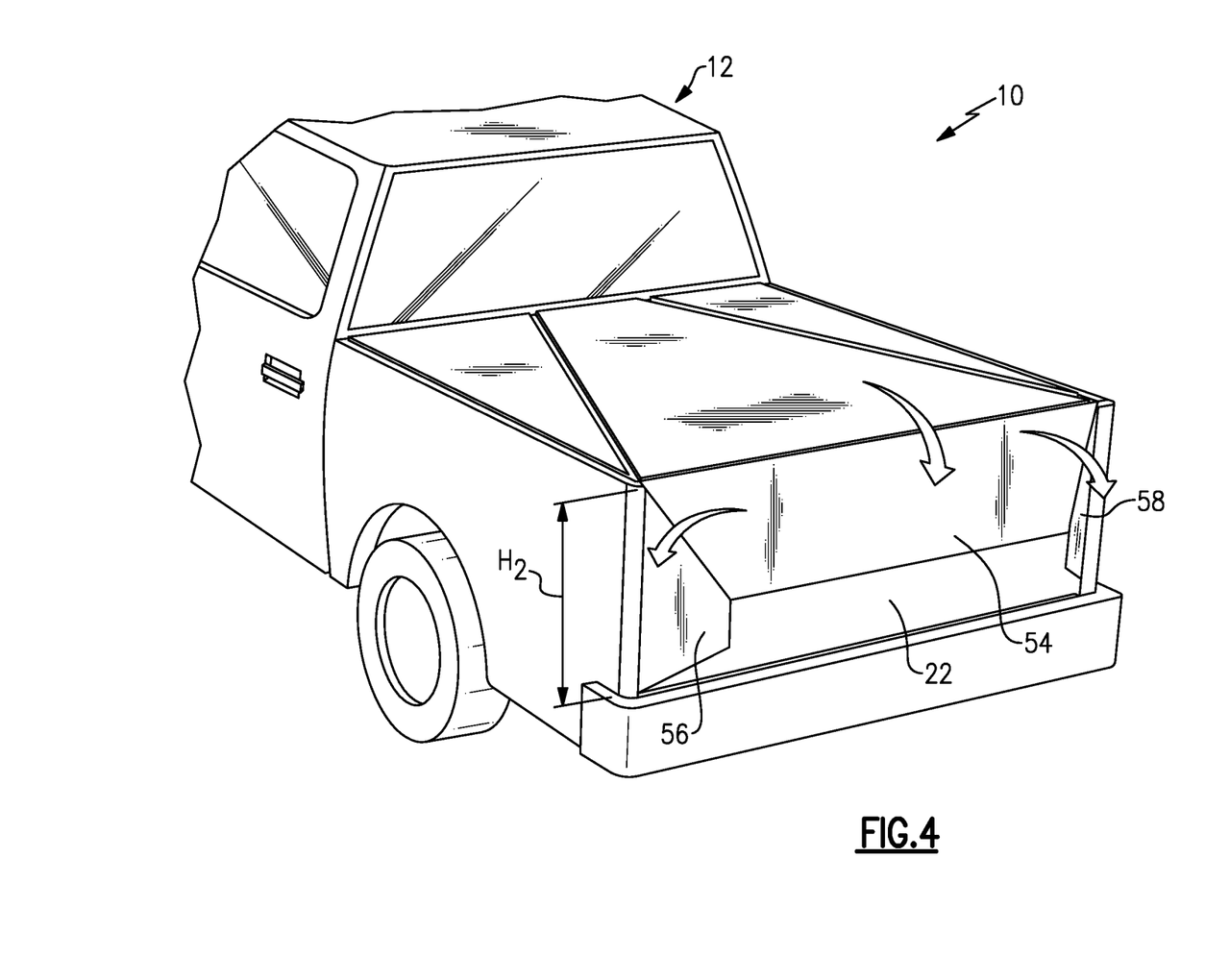
FIG. 4 illustrates the rear fairing in a second configuration.

FIG. 4 illustrates the tonneau cover 16 in a second configuration in which the rear fairing is deployed. In FIG. 4, the middle panel 54 has rotated about axis $X_4$ and projects further rearward than the tailgate 22. The middle panel 54 has rotated over 180° between the first and second configurations in this example such that the middle panel 54 projects downward, toward a ground surface, moving rearwardly. The first and second rear side panels 56, 58 are rotated about their respective axes $X_6$, $X_7$ and abut, either directly or indirectly via a seal, the tailgate 22 at opposite sides of the tailgate 22. Surfaces of the first and second rear side panels 56, 58 adjacent the tailgate 22 in the second configuration exhibit a height substantially equal to a height dimension $H_2$ of the tailgate 22. The first and second rear side panels 56, 58 deflect air passing along the first and second side walls 18, 20 away from the area behind the vehicle 10. The middle panel 54 deflects air passing along a top of the remainder of the tonneau cover 16 away from the area behind the vehicle 10.

In FIG. 3, a majority, if not an entirety, of the panels 54, 56, 58 are forward of the tailgate 22 and rest on top of the tonneau cover 16. The panels 54, 56, 58 attach to the top of the central panel 28 of the tonneau cover 16 using fasteners, as an example. The panels 54, 56, 58 may be moveable manually or using the actuator assembly 44. When in the second configuration of FIG. 4, a majority, if not an entirety, of the panels 54, 56, 58 project rearward of the tailgate 22.

Figure 5:
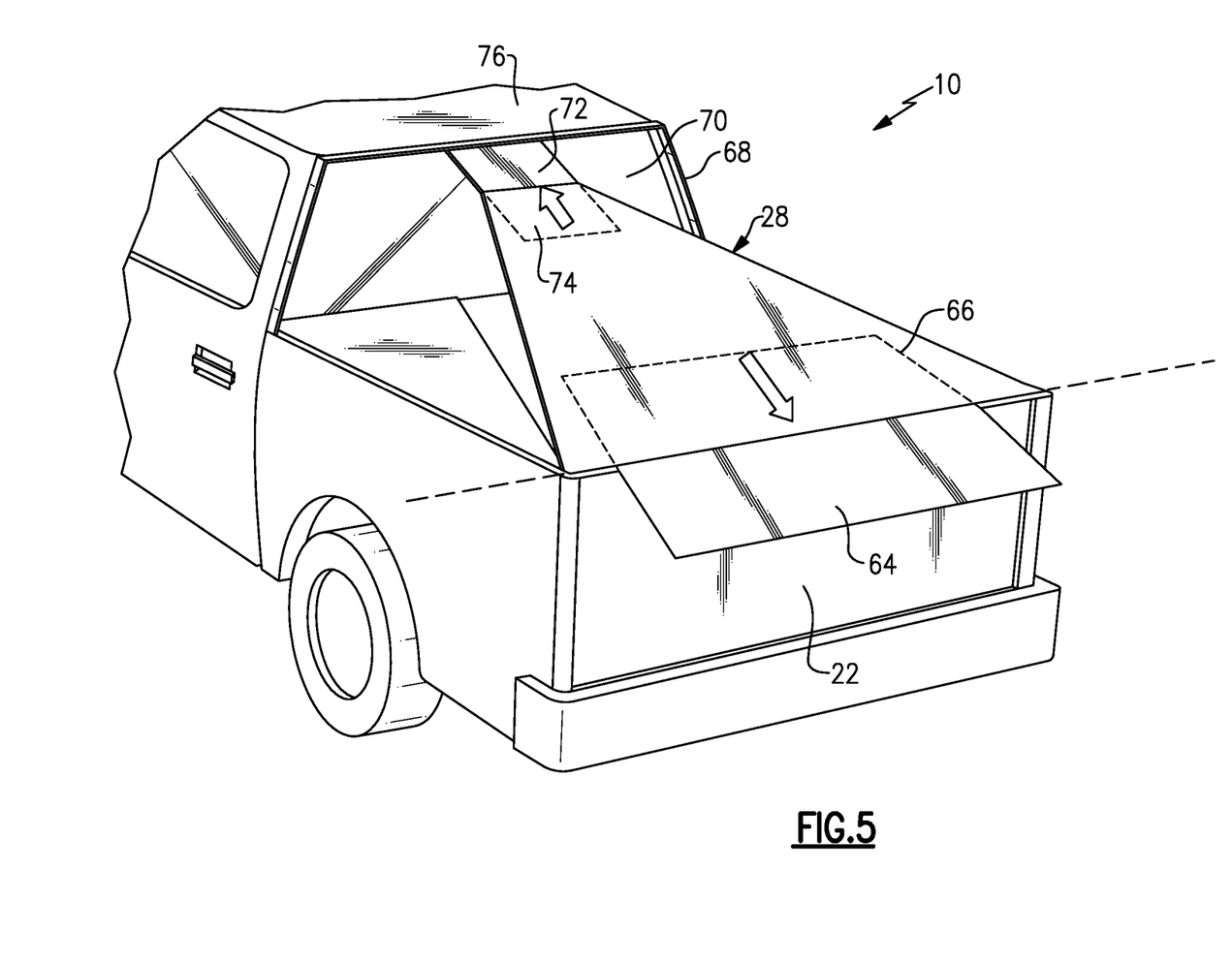
FIG. 5 illustrates another example tonneau cover in a second configuration.

FIG. 5 illustrates another embodiment of the tonneau cover 16. In FIG. 5, the central panel 28 is rotatable about the axis $X_4$. A rear fairing 64 is slidable rearwardly out of a pocket 66 within the central panel 28. When projecting outward of the pocket 66 and rearward of the central panel 28, a majority of the rear fairing 64 is rearward of the tailgate 22. In the position of FIG. 5, the rear fairing 64 deflects air away from an area rearward of the vehicle 10. The rear fairing 64 is deployable manually or automatically using the actuator assembly 44.

FIG. 5 also illustrates an exemplary manner in which the central panel 28 can be held when the forward edge 36 is rotated upward relative to the first configuration. In this example, the vehicle 10 includes a frame 68 circumscribing a window 70 in a rear of the passenger cabin 12. The frame 68 provides an attachment point for slidable connector 72 configured to slide forward of the forward edge 36 out of a pocket 74 formed in the central panel 28. Instead of pockets 66, 74, the slidable elements (rear fairing 64 and connector 72) could be arranged beneath or above a remainder of the central panel 28. The slidable elements (rear fairing 64 and connector 72) can move on tracks mounted relative to the central panel 28. The connector 72 could be fastened to the frame using one or more known types of fasteners. In this example, the frame 68 and connector 72 are arranged such that neither the frame 68 nor connector 72 impedes a view of a center high mount stop lamp (CHMSL) 76 of the vehicle 10. There may be additional elements, such as cameras or sensors, adjacent the CHMSL that are also not impeded by the frame 68 or connector 72. The embodiment of FIG. 5 could be combined with the embodiment of FIG. 2, among others.

Figure 6:
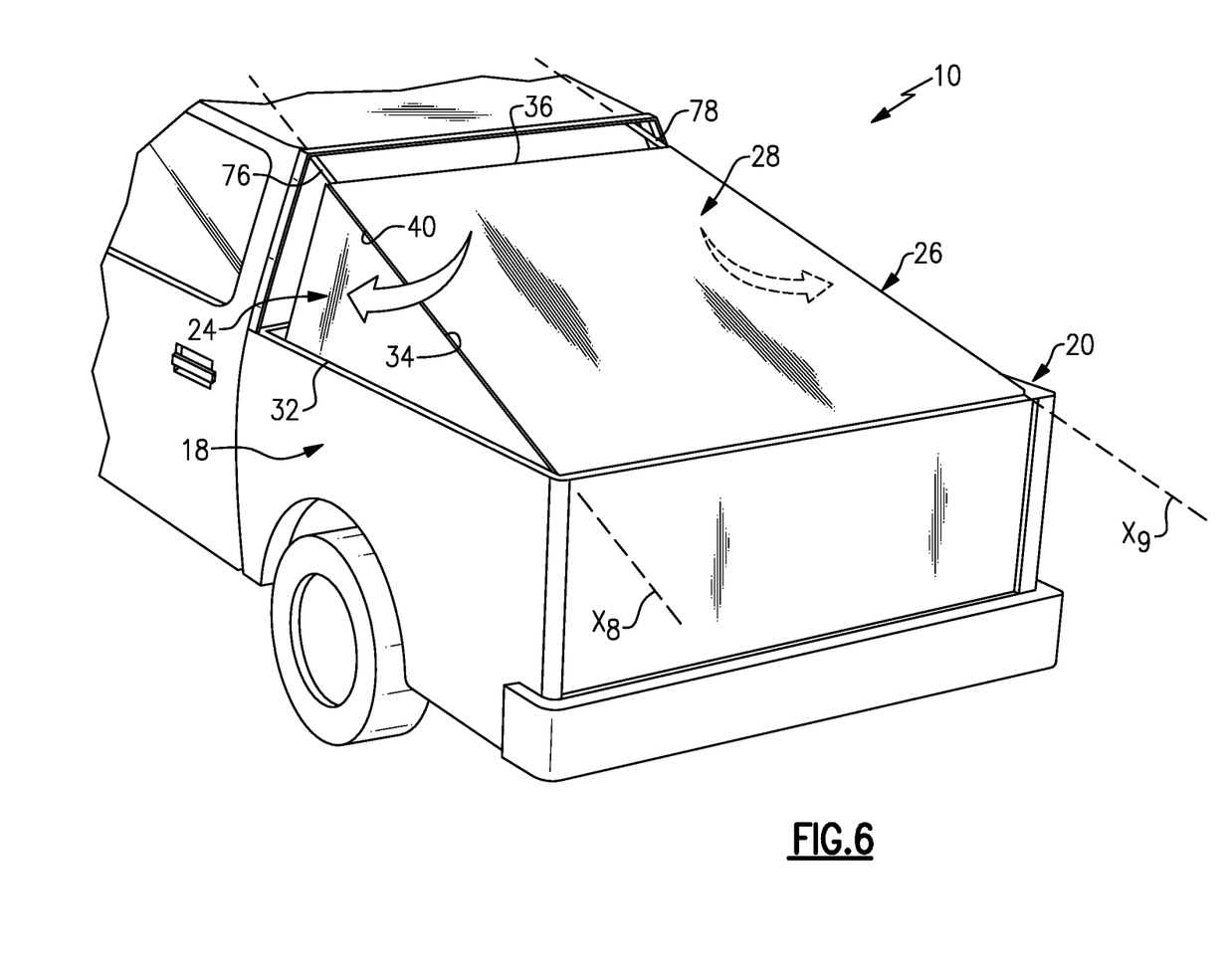
FIG. 6 illustrates yet another example tonneau cover in a second configuration.

FIG. 6 illustrates another embodiment of the tonneau cover 16 in a second configuration. In FIG. 6, the central panel 28 includes a forward edge 36 that spans substantially the entire distance between the first and second side walls 18, 20. The first and second side panels 24, 26 are shaped substantially similar to the embodiment of FIGS. 1 and 2, but in FIG. 6 the first side panel 24, for example, is mounted to the central panel 28 and is configured to rotate relative to the central panel 28 about axis $X_8$. In an example, the second side edge 34 of the first side panel 24 is connected to the first side 40 of the central panel 28 via a hinge. The first side edge 32 of the first side panel 24 connects to a top of the first side wall 18 using one or more fasteners, for example. The second side panel 26, which is not visible in FIG. 6, is arranged substantially identically to the first side panel 24, and is configured to rotate about axis $X_9$ and to connect to a top of the second side wall 20. The central panel 28 is held in the second configuration using first and second connectors 76, 78. The first and second connectors 76, 78 may be tubes configured to slide relative to the central panel 28 to engage a body of the vehicle adjacent a top of the passenger cabin 12.

Figure 7:
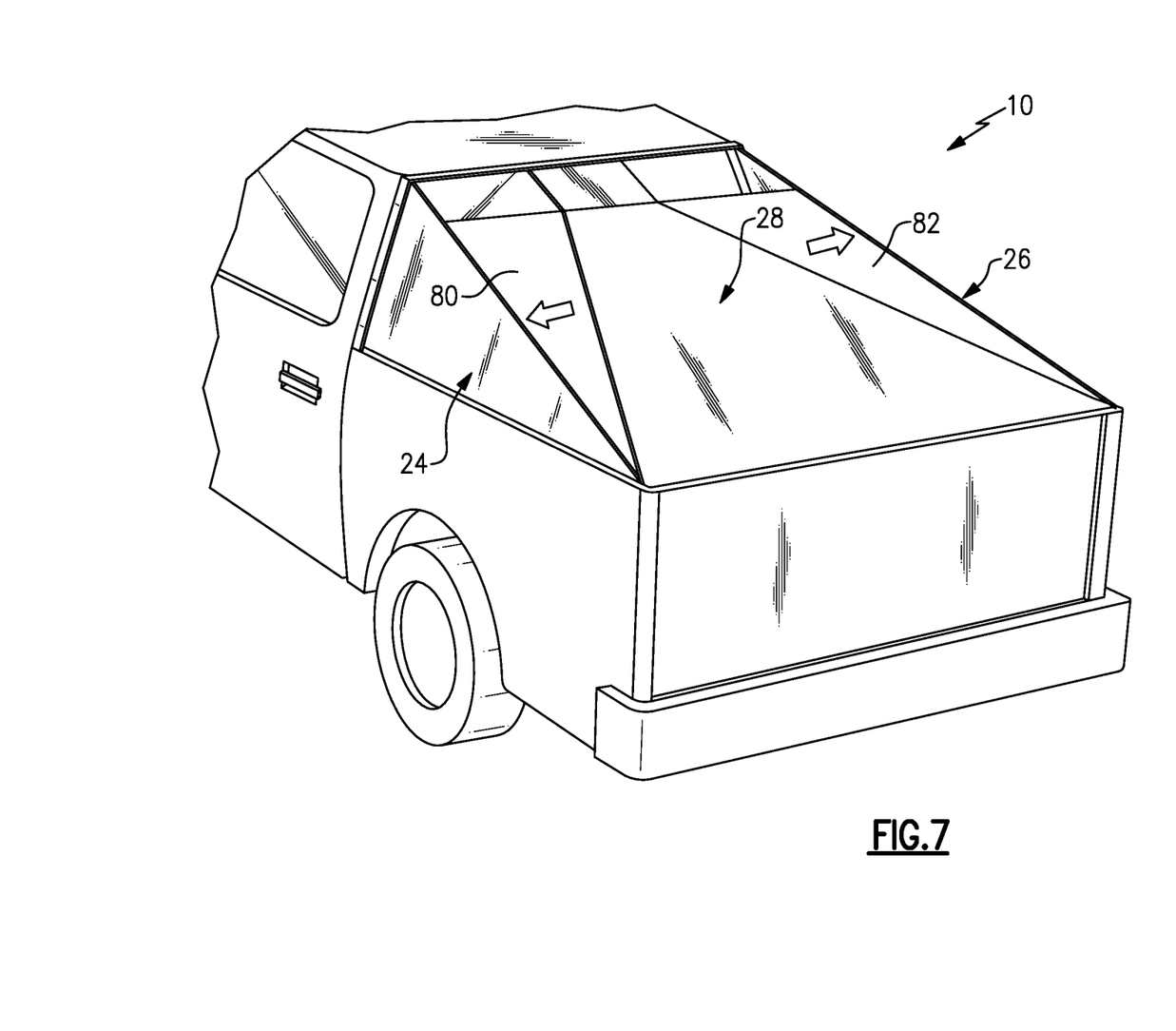
FIG. 7 illustrates another example tonneau cover similar to the tonneau cover of FIG. 6 in a second configuration and with lateral extensions.

FIG. 7 is similar to the embodiment of FIG. 5, but illustrates a second configuration in which each of the central panel 28 and the first and second side panels 24, 26 are raised. In this embodiment, first and lateral extensions 80, 82 moveable laterally relative to the central panel 28 connect the central panel 28 first and second side panels 24, 26 respectively. The first and second lateral extensions 80, 82 may be made of a different material, such as a softer material, than the remainder of the central panel 28.

Figure 8:
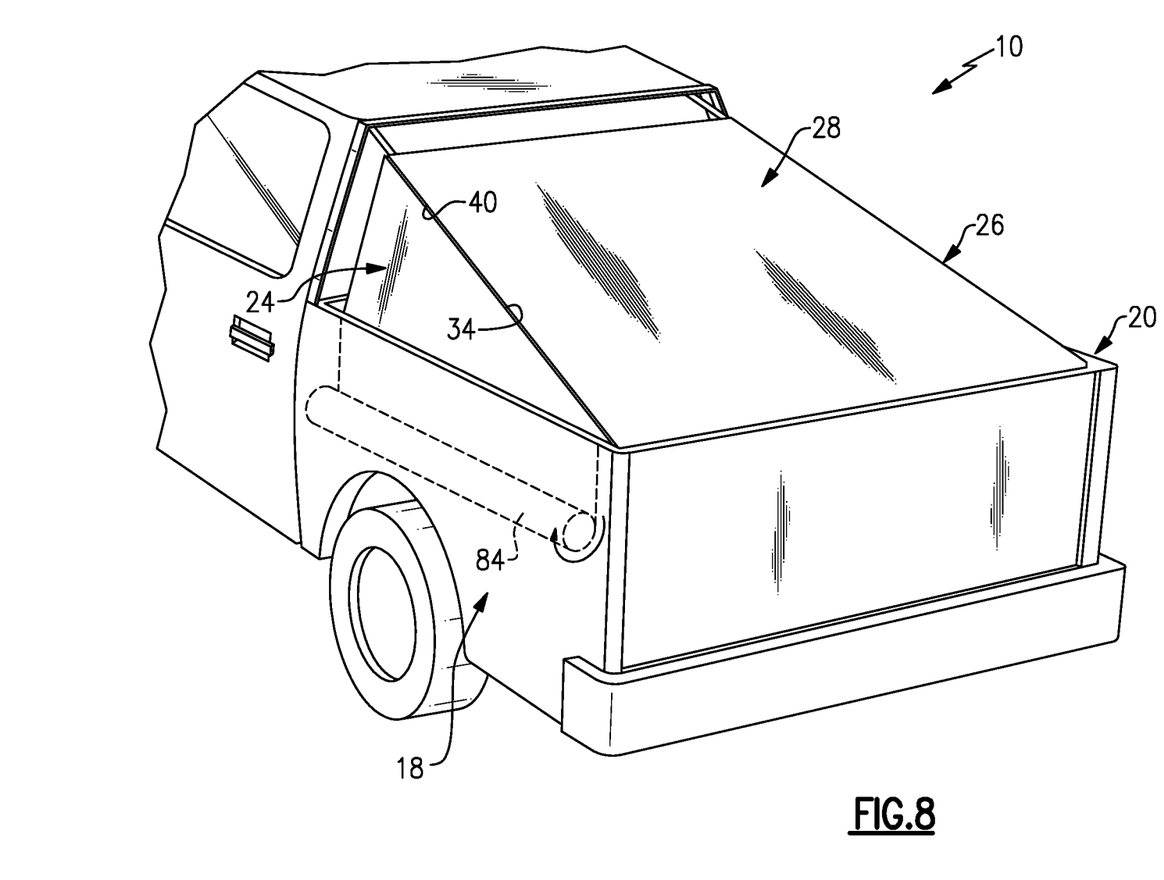
FIG. 8 illustrates an additional example tonneau in a second configuration.

FIG. 8 is representative of another embodiment in which the material of the first side panel 24 is a relatively soft material and is arranged about a roller 84 within or adjacent the first side wall 18. A free end of the material, providing the second side edge 34, is connected to the first side 40 of the central panel 28. As the central panel 28 raises to the second configuration, the material of the first side panel 24 is unrolled from the roller 84, and thereby deploys the first side panel 24. The roller 84 may be spring loaded and biased to pull the material back toward the first configuration of the tonneau cover 16, which keeps tension on the first side panel 24 in the second configuration. The second side panel 26 may be provided by an identical arrangement, reflected about the centerline axis A, and including a roller arranged in or adjacent the second side wall 20.

Figure 9:
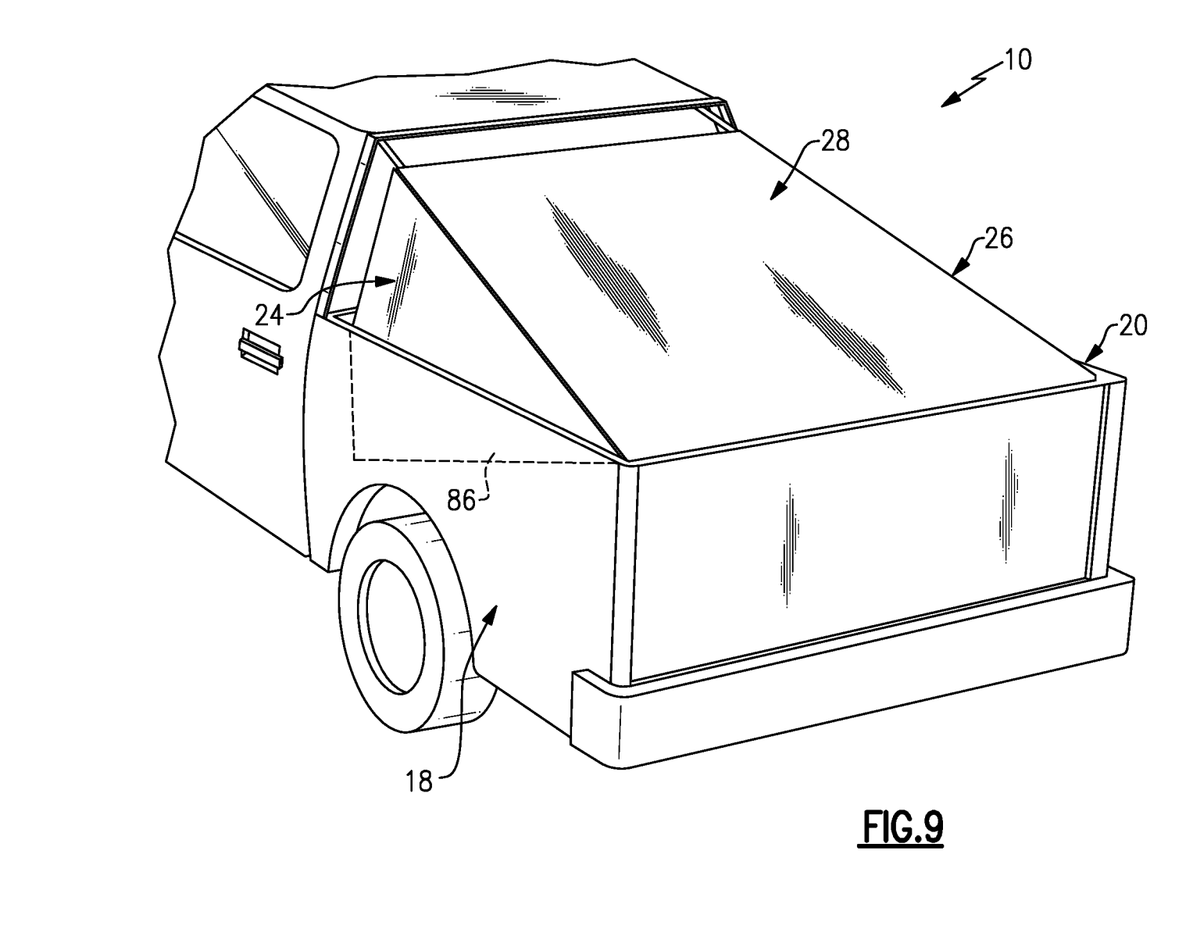
FIG. 9 illustrates still another example tonneau in a second configuration.

FIG. 9 is representative of an example in which the first side panel 24 is a relatively hard material and is rigidly connected to the central panel 28. In this example, the first side wall 18 includes a pocket 86 sized and shaped to receive the first side panel 24 when the tonneau cover 16 is in the first configuration. The pocket 86 may be accessible by a slot in the top of the first side wall 18 and may be arranged between inner and outer panels of the first side wall 18. The second side panel 26 may be configured for receipt in a pocket within the second side wall 20, with the pocket and second side panel 26 arranged substantially similar to the first side panel 24 and first side wall 18, reflected about the centerline axis A.

While not discussed in detail herein, the various panels of the tonneau cover 16 may be attached to a top of the first side wall 18, second side wall 20, and tailgate 22 in the first configuration using tracks, frames, supports, channels, and/or various other known connectors associated with tonneau covers 16.

Figure 10:
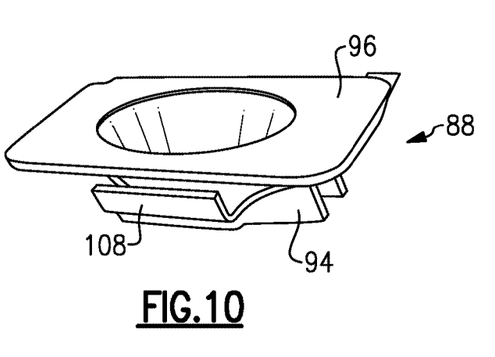
FIG. 10 illustrates an example fastener assembly.
Figure 11:
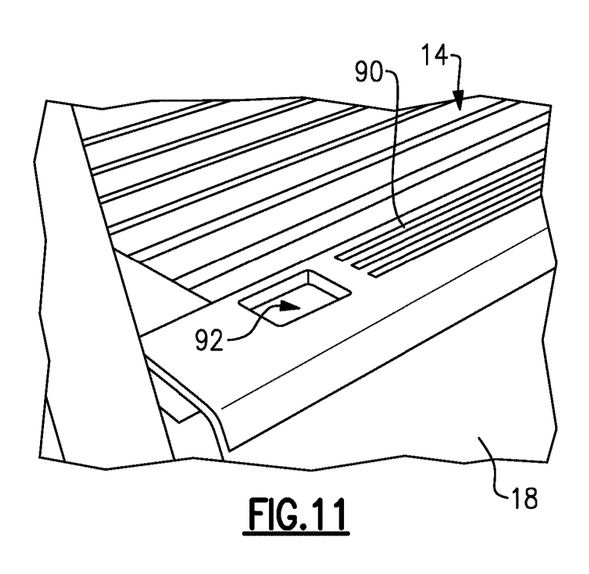
FIG. 11 illustrates a top portion of a side of a cargo area.
Figure 12:
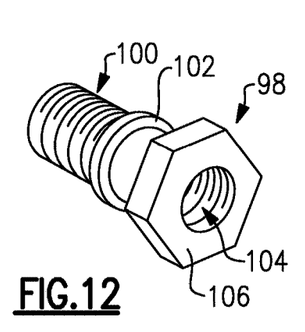
FIG. 12 illustrates an example bolt.

FIGS. 10-13 illustrate an example fastener assembly 88 (FIG. 10) configured to facilitate attachment of the tonneau cover 16 and/or an associated track or frame to the cargo area 14. FIG. 11 illustrates a top 90 of the first side wall 18, including an opening 92, sometimes referred to as a stake hole or stake pocket, configured to receive the fastener assembly 88. The top 90 may include one or more such openings along its length. With reference to FIG. 10, the fastener assembly 88 includes a main body 94 and a relatively wider flange 96 at the top. The fastener assembly 88 includes a central opening in the flange 96 configured to receive a bolt 98 (FIG. 12). In this example, the bolt 98 includes a threaded outer diameter 100 from a free end of its shank to a shoulder 102 at about a midpoint of the shank. The bolt 98 also includes a threaded inner diameter 104 accessible via an opening in a head 106 of the bolt 98. In this example, there are no threads between the head 106 and the shoulder 102.

Figure 13:
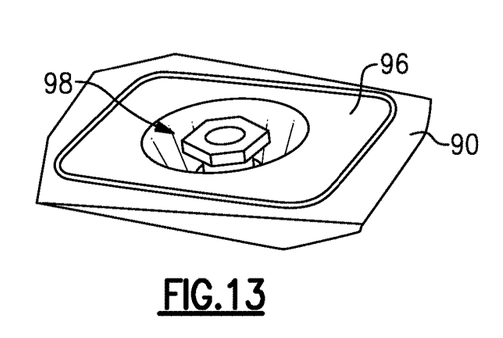
FIG. 13 illustrates the example fastener assembly of FIG. 10 interfaced with the top portion of the side of the cargo area.

To install the fastener assembly 88 relative to the opening 92, the fastener assembly 88 is tilted sideways and inserted into the opening 92 such that a clamp 108 projecting from the main body 94 does not interfere with the top 90. The fastener assembly 88 is configured to rest in the opening 92 such that the flange 96 is flush with the top 90 (FIG. 13). Turning the bolt 98 causes the threaded outer diameter 100 to move the clamp 108 vertically upward to engage the interior of the first side wall 18, thereby holding the fastener assembly 88 in place relative to the first side wall 18. The shoulder 102 prevents the bolt 98 from traveling too far from the top 90, such that the threaded inner diameter 104 is still accessible from above. Another threaded fastener is then used to attach a frame or a portion of the tonneau cover 16 to the fastener assembly 88 via the threaded inner diameter 104.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:
1. A motor vehicle, comprising:
 a cargo area; and
 a tonneau cover including a first side panel, a second side panel, and a central panel between the first and second side panels, wherein the tonneau cover is configurable in a first configuration in which the central, first side, and second side panels provide a cover for a top of the cargo area, and wherein the tonneau cover is configurable in a second configuration in which portions of the first side panel and the second side panel are raised relative to the first configuration.

2. The motor vehicle as recited in claim 1, wherein in the second configuration the first side panel and the second side panel are configured to deflect air away from the cargo area.

3. The motor vehicle as recited in claim 1, wherein the tonneau cover is configured such that, when moving between the first and second configurations:
the first side panel rotates about an axis adjacent a side of the first side panel opposite the central panel, and
the second side panel rotates about an axis adjacent a side of the second side panel opposite the central panel.

4. The motor vehicle as recited in claim 3, wherein the first side panel is connected to a first side wall by a first hinge, and wherein the second side panel is connected to a second side wall by a second hinge.

5. The motor vehicle as recited in claim 1, wherein the tonneau cover is configured such that, when moving between the first and second configurations:
the central panel rotates about an axis adjacent a rear edge of the central panel,
the first side panel rotates about an axis adjacent a first side of the central panel, and
the second side panel rotates about an axis adjacent a second side of the central panel.

6. The motor vehicle as recited in claim 5, wherein the first side panel is connected to the central panel by a first hinge, and wherein the second side panel is connected to the central panel by a second hinge.

7. The motor vehicle as recited in claim 1, wherein the tonneau cover is configured such that, when moving between the first and second configurations:
material providing the first side panel is unrolled from a first roller as the central panel is raised, and
material providing the second side panel is unrolled from a second roller as the central panel is raised.

8. The motor vehicle as recited in claim 1, further comprising:
a rear fairing mounted adjacent a rear end of the tonneau cover, wherein the rear fairing is moveable between a first configuration in which a majority of the rear fairing is forward of a tailgate of the motor vehicle and a second configuration in which a majority of the rear fairing projects rearward of the tailgate.

9. The motor vehicle as recited in claim 8, wherein:
the rear fairing includes a rear panel slidable relative to the central panel.

10. The motor vehicle as recited in claim 8, wherein:
the rear fairing includes a middle panel and first and second rear side panels,
the middle panel is rotatably mounted adjacent a rear end of the central panel,
the first rear side panel is rotatably mounted to a first side of the middle panel, and
the second rear side panel is rotatably mounted to a second side of the middle panel opposite the first side of the middle panel.

11. The motor vehicle as recited in claim 10, wherein, when the rear fairing is in the second configuration, the first rear side panel and the second rear side panel contact the tailgate.

12. The motor vehicle as recited in claim 1, further comprising a connector configured to connect the central panel adjacent a top of a passenger cabin of the motor vehicle when the tonneau cover is in the second configuration.

13. The motor vehicle as recited in claim 1, wherein:
a rear edge of the central panel exhibits a greater dimension than a front edge of the central panel, and
sides of the first and second side panels adjacent the central panel exhibit a greater dimension than sides of the first and second side panels opposite the central panel.

14. The motor vehicle as recited in claim 1, wherein the first and second side panels are at least partially arranged in respective first and second side walls of the cargo area when the tonneau cover is in the first configuration.

15. The motor vehicle as recited in claim 1, further comprising an actuator assembly configured to move the tonneau cover between the first and second configurations.

16. The motor vehicle as recited in claim 15, wherein the actuator assembly is configured to move the tonneau cover from the first configuration to the second configuration when the motor vehicle exceeds a predefined threshold speed.

17. The motor vehicle as recited in claim 1, wherein the motor vehicle is a pickup truck.

18. A method, comprising:
raising portions of a first side panel and a second side panel of a tonneau cover to deflect air away from entering a cargo area of a motor vehicle; and
lowering the portions of the first side panel and the second side panel to cover a top of the cargo area.

19. The method as recited in claim 18, wherein the raising step includes rotating the first and second side panels relative to a central panel of the tonneau cover.

20. The method as recited in claim 18, wherein the raising step includes rotating the first and second side panels relative to respective first and second sides of the cargo area.

* * * * *